United States Patent
Tran et al.

(10) Patent No.: US 12,339,686 B2
(45) Date of Patent: Jun. 24, 2025

(54) CIRCUIT AND METHOD FOR START-UP OF REFERENCE CIRCUITS IN DEVICES WITH A PLURALITY OF SUPPLY VOLTAGES

(71) Applicant: GlobalFoundries U.S. Inc., Malta, NY (US)

(72) Inventors: Dzung T. Tran, Austin, TX (US);
Shivraj G. Dharne, Bangalore (IN);
Asif Iqbal, Bangalore (IN)

(73) Assignee: GlobalFoundries U.S. Inc., Malta, NY (US)

(*) Notice: Subject to any disclaimer, the term of this patent is extended or adjusted under 35 U.S.C. 154(b) by 358 days.

(21) Appl. No.: 18/166,576

(22) Filed: Feb. 9, 2023

(65) Prior Publication Data
US 2024/0275282 A1    Aug. 15, 2024

(51) Int. Cl.
*G05F 1/46* (2006.01)
*H02M 1/36* (2007.01)

(52) U.S. Cl.
CPC .............. *G05F 1/468* (2013.01); *H02M 1/36* (2013.01)

(58) Field of Classification Search
CPC ............ G05F 1/468; G05F 1/10; H02M 1/36
See application file for complete search history.

(56) References Cited

U.S. PATENT DOCUMENTS

| | | | |
|---|---|---|---|
| 4,857,823 A * | 8/1989 | Bitting | G05F 3/267 323/901 |
| 5,684,394 A | 11/1997 | Marshall | |
| 6,201,435 B1 * | 3/2001 | Chou | G05F 3/262 327/543 |
| 11,431,335 B2 | 8/2022 | Yang | |
| 2009/0160419 A1 * | 6/2009 | Jang | G05F 3/30 323/313 |
| 2010/0164609 A1 * | 7/2010 | Yoo | G05F 3/30 327/542 |
| 2012/0229199 A1 | 9/2012 | Tseng | |

* cited by examiner

*Primary Examiner* — Alex Torres-Rivera

(57) ABSTRACT

A reference circuit for an electronic device having a plurality of power supply voltages comprises a supply start-up circuit, a power-down start-up circuit, and a reference generating circuit. The supply start-up circuit comprising a resistive-capacitive (RC) circuit coupled between a first power supply voltage and a ground. The RC circuit includes a pulse node coupled between a first capacitor and a resistive element, and generates a power-up pulse signal at the pulse node. The power-down start-up circuit is powered by a second power supply voltage and comprises a pulse generation circuit that generates a first start-up signal. The reference generating circuit outputs a reference signal. The reference generating circuit exists a low-power mode when either of the power-up pulse signal and the first start-up signal is generated.

20 Claims, 3 Drawing Sheets

CIRCUIT AND METHOD FOR START-UP OF REFERENCE CIRCUITS IN DEVICES WITH A PLURALITY OF SUPPLY VOLTAGES

FIELD OF THE DISCLOSURE

The present disclosure relates to power management of reference circuits that generate a reference voltage or reference current, and in particular to the start-up of a reference circuit in a device using multiple power supply voltages.

BACKGROUND

Circuits that generate a reference voltage or reference current (hereinafter, reference circuits), such as band-gap reference circuits, may have a low-power mode (such as a sleep mode or power-down mode) that reduces the power consumption of the reference circuit. The low-power mode may include a zero-current state or ultra-low-current state, hereinafter collectively referred to as a zero-current state. Entry and exit into the low-power mode may be in response to a power-down signal input to the reference circuit. A start-up circuit may be needed to break the reference circuit out of the zero-current state.

For example, in the zero-current state, a supply voltage to a bias circuit included in reference circuit may still be on, but the bias circuit may be configured so that substantially zero current flows through it.

When the reference circuit is brought back to a normal operating mode from the low-power mode, it needs another start-up circuit to make sure it is working properly.

The process of breaking the reference circuit out of the zero-current state may be more complicated when a device incorporating the reference circuit uses multiple power supplies that may have different voltages and may enter power-down modes independently.

SUMMARY

Embodiments of the present disclosure relate to transitioning a circuit that produces a reference signal (such as a reference current or a reference voltage) from a low-power state wherein the reference signal is not produced to a normal state wherein the reference signal is produced in an electronic device having a plurality of power supplies.

In an embodiment, a reference circuit for an electronic device having a plurality of power supply voltages and a ground common to the plurality of power supply voltages comprises a supply start-up circuit, a first power-down start-up circuit, and a reference generating circuit. The supply start-up circuit comprises a resistive-capacitive (RC) circuit coupled between a first power supply voltage of the plurality of power supply voltages and the ground, and includes a first capacitor, a resistive element, and a pulse node coupled between the first capacitor and the resistive element. A power-up pulse signal is generated at the pulse node. The first power-down start-up circuit is powered by a second power supply voltage of the plurality of power supply voltages, and comprises a first pulse generation circuit that generates a first start-up signal. The reference generating circuit outputs a reference signal, and is configured to enter a normal mode when the power-up pulse signal is generated and to transition from a low-power mode to the normal mode when the first start-up signal is generated.

In another embodiment, an electronic device powered by a first power supply voltage comprises a supply power generation circuit and a reference circuit. The supply power generation circuit produces a second power supply voltage using the first power supply voltage. The reference circuit comprises a resistive-capacitive (RC) circuit coupled between a first power supply voltage of the plurality of power supply voltages and the ground, and includes a first capacitor, a resistive element, and a pulse node coupled between the first capacitor and the resistive element. A power-up pulse signal is generated at the pulse node. The first power-down start-up circuit is powered by a second power supply voltage of the plurality of power supply voltages, and comprises a first pulse generation circuit that generates a first start-up signal. The reference generating circuit outputs a reference signal, and is configured to enter a normal mode when the power-up pulse signal is generated and to transition from a low-power mode to the normal mode when the first start-up signal is generated.

In another embodiment, a method of controlling a mode of a reference generating circuit in an electronic device having a plurality of power supply voltages comprises producing, at a pulse node of a resistive-capacitive (RC) circuit powered by a first power supply voltage of the plurality of power supply voltages, a power-up pulse signal when the first power supply voltage is turned on; placing the reference generating circuit in the low-power mode when a first power-down enable signal associated with a second power supply voltage of the plurality of power supply voltages is asserted; producing, using a first pulse generation circuit, a first start signal when the first power-down enable signal is de-asserted; placing the reference generating circuit in a normal mode when the power-up pulse signal is produced; and transitioning the reference generating circuit from the low power mode to the normal mode when the first start signal is produced.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1A:
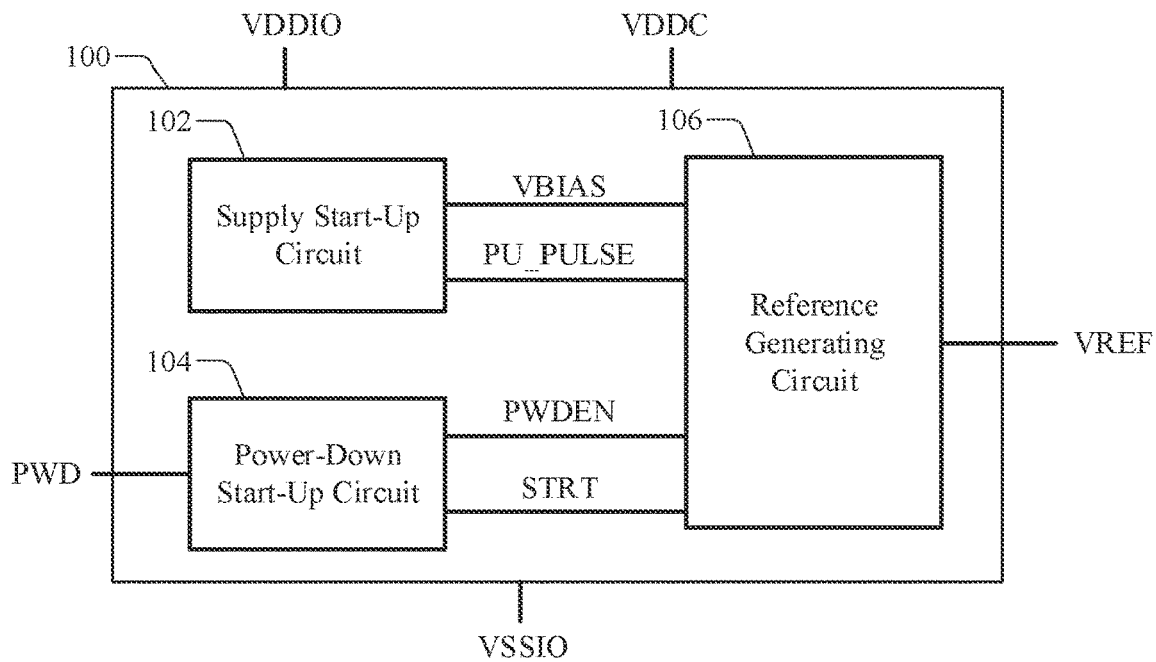
FIG. 1A illustrates a reference circuit according to an embodiment of the present disclosure.

Exemplary embodiments of the present disclosure will be described below in more detail with reference to the accompanying drawings. The inventive features may, however, be embodied in different forms and should not be construed as limited to the embodiments set forth herein. Rather, these embodiments are provided so that this disclosure will be thorough and complete, and will fully convey the scope of the present claims to those skilled in the art. Throughout the disclosure, like reference numerals refer to like parts throughout the various figures and embodiments.

It will be understood that, although the terms "first" and/or "second" may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

The drawings are not necessarily to scale and in some instances, proportions may have been exaggerated in order to clearly illustrate features of the embodiments. When a first element is referred to as being "on" a second element or "on" a substrate, it not only refers to a case where the first element is formed directly on the second element or the substrate but also a case where a third element exists between the first element and the second element or the substrate.

An element "connected" or "coupled" to or with another element may be directly connected or coupled to or with the other element or, instead, one or more intervening elements may be present. An element "contact" another element may be directly on or in direct contact with the other element or, instead, one or more intervening elements may be present.

A signal being asserted generally refers to the signal having a logical true value, such as may correspond to a positive voltage. A signal not being asserted generally refers to the signal having a logical false value, such as may correspond to a ground voltage. A signal being de-asserted may correspond to a transition of the signal from a logical true value to a logical false value, such as may correspond to a negative (falling) edge of the signal.

FIG. 1A illustrates a reference circuit 100 according to an embodiment of the present disclosure. The reference circuit 100 includes a supply start-up circuit 102, a power-down start-up circuit 104, and a reference generating circuit 106.

The reference circuit 100 receives two supply voltages, here, a first supply voltage VDDIO and a second supply voltage VDDC. The first supply voltage VDDIO may be an Input/Output (IO) circuit supply voltage, and the second supply voltage VDDC may be a core supply voltage, but embodiments are not limited thereto. Both supply voltages use the same ground VSSIO.

In embodiments, the second supply voltage VDDC has a voltage equal to or lower than a voltage of the first supply voltage VDDIO. For example, in an illustrative embodiment, the first supply voltage VDDIO may be 3.3 volts or 5 volts, and the second supply voltage may be 0.8 volts, but embodiments are not limited thereto.

The supply start-up circuit 102 generates a power-up pulse signal PU_PULSE in response to the initial rise in the voltage of the first supply voltage VDDIO when the first supply voltage VDDIO is first supplied. In the illustrated embodiments, the supply start-up circuit 102 also generates a bias voltage VBIAS for the reference generating circuit 106 from the first supply voltage VDDIO, but embodiments are not limited thereby.

The power-down start-up circuit 104 receives a power down signal PWD that is used to determine whether the reference circuit 100 should be operating in the low-power mode or the normal mode. The power down signal PWD being asserted may correspond to the second supply voltage VDDC being turned off.

Based on the power down signal PWD, the power-down start-up circuit 104 produces a power-down enable signal PWDEN that is used to control whether the reference generating circuit 106 should operate in a low-power mode, and a start pulse signal STRT that indicates that the reference generating circuit 106 should transition to operating in the normal mode.

The reference generating circuit 106 generates a reference voltage VREF when operating in the normal mode, but may not generate the reference voltage VREF when operating in the low-power mode.

The reference generating circuit 106 receives the power-up pulse signal PU_PULSE and the start pulse signal STRT and, when the reference generating circuit 106 is not operating in the normal operating mode and the power-down enable signal PWDEN is not asserted, begins operating in the normal operating mode in response to receiving a pulse on either or both of the power-up pulse signal PU_PULSE and the start pulse signal STRT.

In an embodiment, the power-up pulse signal PU_PULSE and the start pulse signal STRT may be OR'd together to produce an internal start pulse for initiating normal operation of the reference generating circuit 106, but embodiments are not limited thereto. The internal start pulse may operate to break a reference current generation circuit of the reference generating circuit 106 away from a zero-current state, which may be performed in a manner known in the related art.

The reference generating circuit 106 enters the low-power mode when the power-down enable signal PWDEN is asserted. In embodiments, the first supply voltage VDDIO remains on while the reference generating circuit 106 is in the low-power mode.

In an illustrative embodiment, the reference generating circuit 106 may draw 18 microamps in the normal mode, but only 46 nanoamps in the low-power mode. Accordingly, a power dissipation of the reference circuit 100 when in the low-power mode may one-one-hundredth or less of a power dissipation of the reference circuit 100 when in the normal mode.

Additional internal details of the reference generating circuit 106B would be known to a person of ordinary skill in the art, and thus are omitted in the interest of brevity.

Figure 1B:
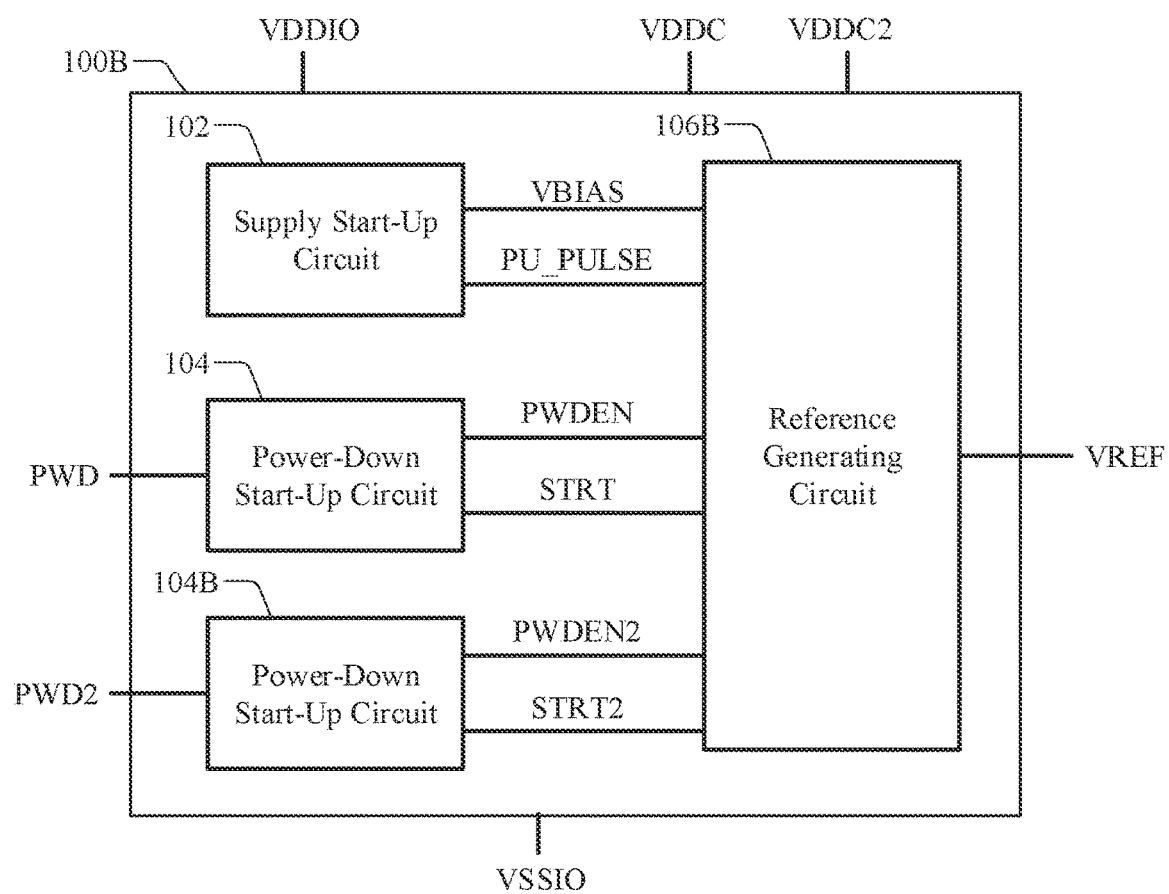
FIG. 1B illustrates a reference circuit according to another embodiment of the present disclosure.

FIG. 1B illustrates reference circuit 100B according to another embodiment of the present disclosure. The reference circuit 100B includes the supply start-up circuit 102 and the power-down start-up circuit 104 (now referred to as first power-down start-up circuit 104) shown in FIG. 1, a second power-down start-up circuit 104B, and a reference generating circuit 106B.

The reference circuit 100B receives the two supply voltages received by the reference circuit 100 and also receives a third supply voltage VDDC2, which like the second supply voltage VDDC uses the ground VSSIO and has a voltage equal to or lower than the voltage of the first supply voltage VDDIO. The third supply voltage VDDC2 may be a second core supply voltage, but embodiments are not limited thereto.

The second power-down start-up circuit 104B receives a second power down signal PWD2 that is used to determine whether the reference circuit 100 should be operating in the low-power mode or the normal mode. The second power down signal PWD2 being asserted may correspond to the third supply voltage VDDC2 being turned off.

Based on the second power down signal PWD2, the second power-down start-up circuit 104B produces a second power-down enable signal PWDEN2 that is used to determine whether the reference generating circuit 106B should operate in the low-power mode, and a second start pulse signal STRT2 that indicates that the reference generating circuit 106 should transition to operating in the normal mode.

The reference generating circuit 106B generates a reference voltage VREF when operating in the normal mode, but may not generate the reference voltage VREF when operating in the low-power mode.

The reference generating circuit 106B receives the power-up pulse signal PU_PULSE, the start pulse signal STRT (now referred to as a first start pulse signal STRT), and the second start pulse signal STRT2. When the reference generating circuit 106 is not operating in the normal operating mode and the power-down enable signal PWDEN (now referred to as a first power-down enable signal PWDEN) and the second power-down enable signal PWDEN2 not both asserted, the reference generating circuit 106B begins operating in the normal operating mode in response to receiving a pulse on the power-up pulse signal PU_PULSE, the first start pulse signal STRT, the second start pulse signal STRT2, or any combination thereof.

In an embodiment, the power-up pulse signal PU_PULSE, the first start pulse signal STRT, and the second start pulse signal STRT2 may be OR'd together to produce an internal start pulse for initiating normal operation of the reference generating circuit 106, but embodiments are not limited thereto. The internal start pulse may operate to break a reference current generation circuit of the reference generating circuit 106B away from a zero-current state, which may be performed in a manner known in the related art.

In an embodiment, the first power-down enable signal PWDEN and the second power-down enable signal PWDEN2 may be combined using an AND gate to produce a single power-down enable signal that is used to determine whether the reference generating circuit 106B should operate in the low-power mode.

Additional internal details of the reference generating circuit 106B would be known to a person of ordinary skill in the art, and thus are omitted in the interest of brevity.

Figure 2:
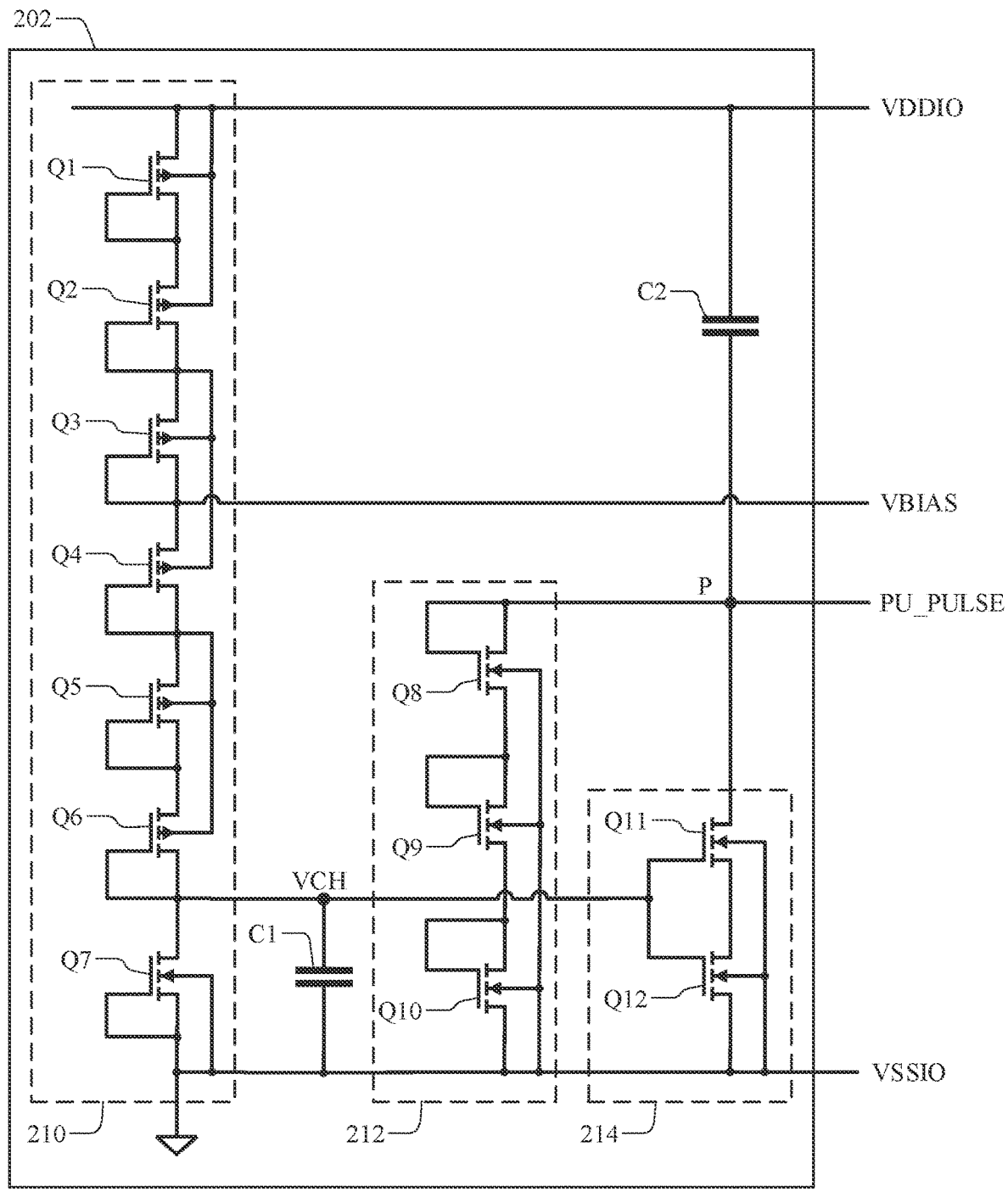
FIG. 2 illustrates a supply start-up circuit according to an embodiment of the present disclosure.

FIG. 2 illustrates a supply start-up circuit 202 according to an embodiment of the present disclosure. The supply start-up circuit 202 may correspond to the supply start-up circuit 102 of FIG. 1A.

The supply start-up circuit 202 include a bias string 210, a voltage limiter 212, an active resistor 214, a first capacitor C1, and a second capacitor C2.

The bias string 210 comprises first, second, third, fourth, fifth, sixth, and seventh transistors Q1, Q2, Q3, Q4, Q5, Q6, and Q7 coupled in series between the first supply voltage VDDIO and the ground VSSIO.

The first to sixth transistors Q1 to Q6 may be configured as saturation devices having respective gates couple to respective sources/drains. In FIG. 2, the first to sixth transistors Q1 to Q6 are shown as p-channel Metal Oxide Semiconductor Field Effect Transistors (MOSFETs), but embodiments are not limited thereto; in an embodiment, the first to sixth transistors Q1 to Q6 may be n-channel MOSFETs. In an embodiment, the first to sixth transistors Q1 to Q6 are laterally-diffused (LD) MOSFETs, but embodiments are not limited thereto.

In an embodiment, to limit the gate-source voltages Vgs of the first to sixth transistors Q1 to Q6, the first and second transistors Q1 and Q2 may be fabricated in a first well, the third and fourth transistors Q3 and Q4 may be fabricated in a second well, and the fifth and sixth transistors Q5 and Q6 may be fabricated in a third well. The body of the first well may be connected to the first supply voltage VDDIO, the body of the second well may be connected to the source/drain of the second transistor Q2, and the body of the third well may be connected to the source/drain of the fourth transistor Q4. In an illustrative embodiment, this configuration operates to limit the gate-source voltages Vgs of the first to sixth transistors Q1 to Q6 to 1.98 volts.

The seventh transistor Q7 is configured as a diode-connected transistor and operates in reverse bias. The seventh transistor Q7 therefore operates so that the bias string 210 draw substantially zero current in a steady (DC) state, such as after the first capacitor C1 has completed charging. In FIG. 2, the seventh transistor Q7 is shown as an n-channel MOSFETs, but embodiments are not limited thereto.

The bias string 210 produces a bias voltage VBIAS at the junction of the source/drain of the third transistor Q3 and the drain/source of the fourth transistor Q4, which bias voltage VBIAS is used by other circuits such as the reference generating circuit 106 of FIG. 1. The bias string 210 also provides a current to a charging voltage node VCH at the junction of the source/drain of the sixth transistor Q6 and the drain of the seventh transistor Q7.

The voltage limiter 212 comprises one or more diode-connected transistors connected in series between a pulse node P and the ground VSSIO. The diode-connected transistors are configured to operate in forward-bias mode to limit the voltage of a power-up pulse signal PU_PULSE produced at the pulse node P according to the number of transistors connected in series.

In the embodiment illustrated in FIG. 2, the voltage limiter 212 comprises three transistors (eighth, ninth, and tenth transistors Q8, Q9, and Q10), but embodiments are not limited thereto. In the embodiment illustrated in FIG. 2, the eighth, ninth, and tenth transistors Q8, Q9, and Q10 are n-channel MOSFETs, but embodiments are not limited thereto.

The voltage limiter 212 operates to prevent damage to external transistors coupled to the power-up pulse signal PU_PULSE. In the illustrated embodiment wherein the external transistors are LDMOSFETs, the voltage limiter 212 may limit the voltage of the power-up pulse signal PU_PULSE to 1.98 volts.

The active resistor 214 comprises eleventh and twelfth transistors Q11 and Q12 coupled in series and having control terminals (in the example, gates) coupled together to the a charging voltage node VCH. The active resistor is connected between the pulse node P and the ground VSSIO.

The first capacitor C1 is connected between the charging voltage node VCH and the ground VSSIO and accumulates current provided to the charging voltage node VCH from the bias string 210 to produce the voltage on the charging voltage node VCH. The second capacitor C2 is connected between the first supply voltage VSSIO and the pulse node P. A capacitance of the second capacitor C2 may be determined according to a ramp time of the first supply voltage VDDIO, which may be in the range of a few milliseconds. For example, the capacitance of the second capacitor C2 may be 5 to 10 picofarads.

When the first supply voltage VDDIO is off, the first and second capacitors C1 and C2 are discharged, a voltage of the charging node VCH is zero, and a voltage of the power-up pulse signal PU_PULSE is zero.

In response to the first supply voltage VDDIO being turned on, the voltage of the voltage of the charging node VCH starts to increase. During an initial period after the first supply voltage VDDIO is turned on, the voltage of the charging node VCH starts is too low to turn on the active resistor 214, and as a result the voltage of the power-up pulse signal PU_PULSE rises to the voltage of the first supply voltage VDDIO until the voltage of the power-up pulse signal PU_PULSE reaches the limit imposed by the voltage limiter 212.

Once the voltage of the charging node VCH rises to a voltage high enough to turn on the active resistor 214, the active resistor 214 turns on and discharges the pulse node P, so that the voltage of the power-up pulse signal PU_PULSE decreases to 0 volts.

In this manner, the supply start-up circuit 202 produces a positive-voltage pulse having a maximum voltage determined by the voltage limiter 212 on the power-up pulse signal PU_PULSE in response to the first supply voltage VDDIO being turned on.

Figure 3:
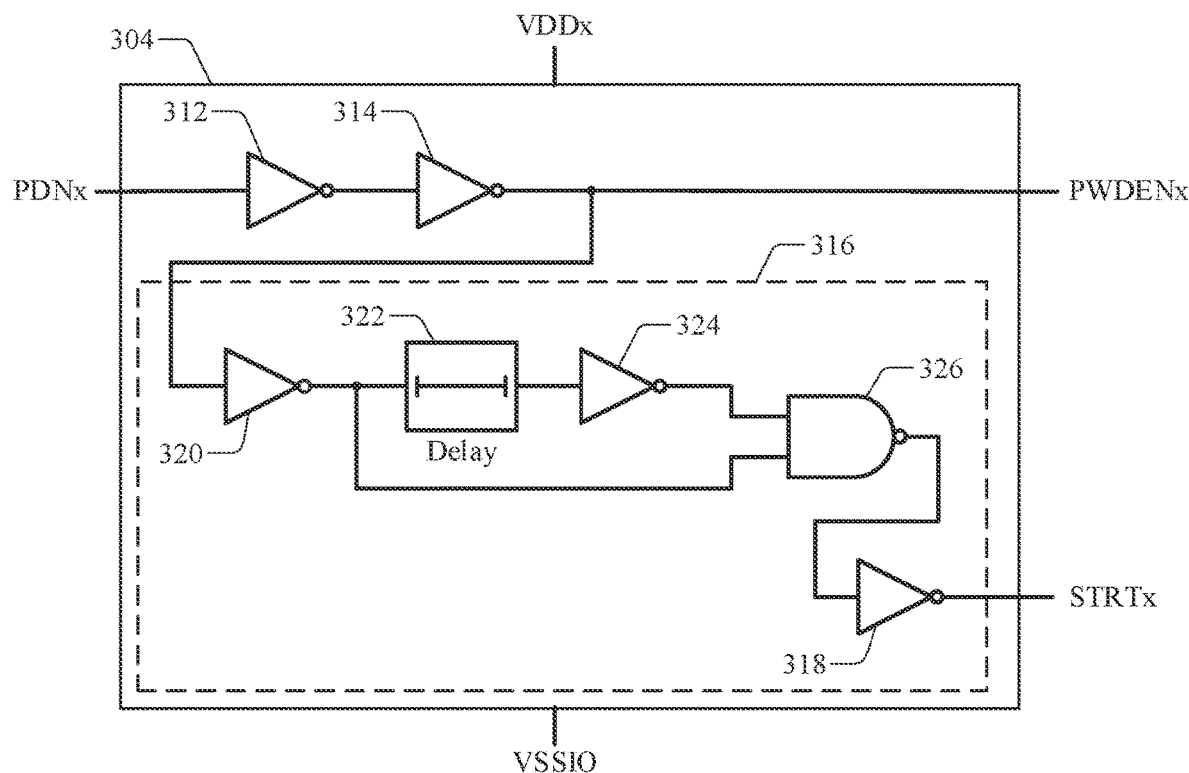
FIG. 3 illustrates a power-down start-up circuit according to an embodiment of the present disclosure.

FIG. 3 illustrates a power-down start-up circuit 304 according to an embodiment of the present disclosure. The power-down start-up circuit 304 may be powered by a controlled supply voltage VDDx that uses ground VSSIO. The power-down start-up circuit 304 receives a controlled supply voltage power-down signal PDNx and produces a power-down enable signal PWDENx and a start pulse signal STRTx. Each of the controlled supply voltage power-down signal PDNx, the power-down enable signal PWDENx, and the start pulse signal STRTx correspond to the controlled supply voltage VDDx that powers the circuits of the power-down start-up circuit 304.

Accordingly, the power-down start-up circuit 304 may correspond to the power-down start-up circuit 104 of FIG. 1A, in which case the controlled supply voltage VDDx corresponds to the second supply voltage VDDC, the power-down enable signal PWDENx corresponds to the power-down enable signal PWDEN, the controlled supply voltage power-down signal PDNx corresponds to the power-down signal PDN, and the start pulse signal STRTx corresponds to the start pulse signal STRT.

The power-down start-up circuit 304 may also correspond to the first power-down start-up circuit 104 of FIG. 1B, in which case the controlled supply voltage VDDx corresponds to the second supply voltage VDDC, the power-down enable signal PWDENx corresponds to the first power-down enable signal PWDEN, the controlled supply voltage power-down signal PDNx corresponds to the first power-down signal PDN, and the start pulse signal STRTx corresponds to the first start pulse signal STRT.

The power-down start-up circuit 304 may also correspond to the second power-down start-up circuit 104B of FIG. 1B, in which case the controlled supply voltage VDDx corresponds to the third supply voltage VDDC2, the power-down enable signal PWDENx corresponds to the second power-down enable signal PWDEN2, the controlled supply voltage power-down signal PDNx corresponds to the second power-down signal PDN2, and the start pulse signal STRTx corresponds to the second start pulse signal STRT2.

The power-down start-up circuit 304 comprises a first inverter 312 coupled in series with a second inverter 314, These two inverters receive the controlled supply voltage power-down signal PDNx and buffer it to produce the power-down enable signal PWDENx. In another embodiment, the first and second inverters 312 and 314 may be omitted, and the power-down enable signal PWDENx may be the controlled supply voltage power-down signal PDNx.

The power-down start-up circuit 304 further comprises a pulse generation circuit 316 that produces a positive magnitude pulse on its output in response to a falling edge of the power-down enable signal PWDENx.

In the embodiment of FIG. 3, the pulse generation circuit 316 comprises a third inverter 320 that receives the power-down enable signal PWDENx, a delay circuit 322 that receives an output of the third inverter 320 and produces a non-inverted output delayed by a delay time, a fourth inverter 324 that receives the output of the delay circuit 322, a NAND circuit 326 that receives the output of the third inverter 320 and an output of the fourth inverter 324, and a fifth inverter 318 that receives the output of the NAND circuit 326 and produces the output of the start pulse signal STRTx.

The start pulse signal STRTx comprises a pulse with a positive magnitude that is generated shortly after and in response to the falling edge of the power-down enable signal PWDENx. The duration of the pulse is determined by the delay time of the delay circuit 322, which may be 1 to 3 nanoseconds.

Figure 4:
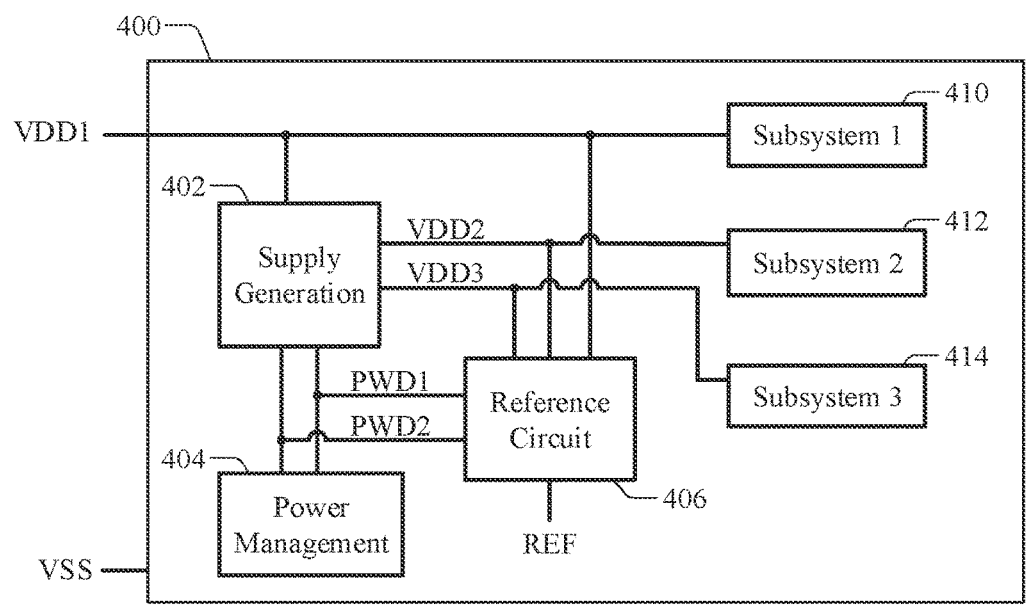
FIG. 4 illustrates an electronic device according to an embodiment of the present disclosure.

FIG. 4 illustrates an electronic device 400 according to an embodiment of the present disclosure. The electronic device 400 may be an Application-Specific Integrated Circuit (ASIC), a processor, a signal processor, a memory device, or the like. The electronic device 400 receives a first power supply voltage VDD1 and a corresponding ground VSS.

The electronic device 400 includes a power supply generation circuit 402, a power management circuit 404, a reference circuit 406, and first, second, and third subsystems 410, 412, and 414. The reference circuit 406 may correspond to the reference circuit 100B of FIG. 1B.

The power supply generation circuit 402 uses the first power supply voltage VDD1 to generate second and third power supply voltages VDD2 and VDD3 according to first and second power-down signals PWD1 and PWD2, respectively. When the first power supply voltage VDD1 is on, the power supply generation circuit 402 generates the second power supply voltage VDD2 when the first power-down signals PWD1 is not asserted, and generates the third power supply voltage VDD2 when the second power-down signals PWD2 is not asserted. The second and third power supply voltages VDD2 and VDD3 use the same ground VSS as the first power supply voltage VDD1 and have lower respective voltages than the first power supply voltage VDD1.

The first, second, and third power supply voltages VDD1, VDD2, and VDD3 power the first, second, and third subsystems 410, 412, and 414, respectively.

The power management circuit 404 produces the first and second power-down signals PWD1 and PWD2. The power management circuit 404 controls the first and second power-down signals PWD1 and PWD2 in order to reduce power consumption of the electronic device 400. In an illustrative embodiment, the power management circuit 404 asserts the first power-down signal PWD1 when the second subsystem 412 is inactive, and asserts the second power-down signal PWD2 when the third subsystem 414 is inactive.

The reference circuit 406 produces a reference signal REF that, in an illustrative case, is used by the second and third subsystems 412 and 414. The reference signal REF may include a reference voltage, a reference current, or both.

As described in more detail with reference to FIGS. 1A and 1B, to reduce the power consumption of the electronic device 400, the reference circuit 406 turns off generation of the reference signal REF when the reference signal REF is not in use. In the illustrative case of FIG. 4, the reference signal REF is in use when one or more of the second and third subsystems 412 and 414 are active, and is not in use when both the of the second and third subsystems 412 and 414 are inactive.

Accordingly, in the illustrative case of FIG. 4, the reference circuit 406 enters a low-power mode when both of the first and second power-down signals PWD1 and PWD2 are asserted. The reference circuit 406 exits the low-power mode and enters a normal mode in response to one or both of the first and second power-down signals PWD1 and PWD2 being de-asserted.

The reference circuit 406 does not require the first and second power-down signals PWD1 and PWD2 to be asserted or de-asserted in any particular order. Accordingly, the reference circuit 406 exits the low-power mode and enters a normal mode in response to either of the first and second power-down signals PWD1 and PWD2 being de-asserted.

As described above, in a circuit having a plurality of power supplies wherein one or more power supplies may be independently placed in respective power-down states, embodiments of present disclosure permit the reference circuit to be transitioned from a low-power or zero-power mode (wherein the reference voltage is not generated) to a normal mode (wherein the reference voltage is generated) without imposing restrictions on the sequence in which the one or more power supplies are brought out of their respective power-down states.

For example, in the example of FIG. 1B, the reference generating circuit 106B may be placed in the low-power mode when both the second and third power supplies VDDC and VDDC2 enter their respective power-down states, and may be returned to the normal mode when either one of the second and third power supplies VDDC and VDDC2 exit its respective power down state, without regard to which power supply exited the power down state.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

The invention claimed is:

1. A reference circuit for an electronic device having a plurality of power supply voltages and a ground common to the plurality of power supply voltages, the reference circuit comprising:
   a supply start-up circuit comprising a resistive-capacitive (RC) circuit coupled between a first power supply voltage of the plurality of power supply voltages and the ground and including a first capacitor, a resistive element, and a pulse node coupled between the first capacitor and the resistive element, wherein a power-up pulse signal is generated at the pulse node;
   a first power-down start-up circuit powered by a second power supply voltage of the plurality of power supply voltages and comprising a first pulse generation circuit that generates a first start-up signal; and
   a reference generating circuit having a normal mode and a low-power mode and outputting a reference signal, the reference generating circuit configured to enter the normal mode when the power-up pulse signal is generated and to transition from the low-power mode to the normal mode when the first start-up signal is generated.

2. The reference circuit of claim 1, further comprising:
   a bias string comprising a plurality of transistors connected in series between the first power supply voltage and the ground, the plurality of transistors including:
      a reverse-biased diode-connected transistor coupled between a charging node and the ground, and
      a first saturation-mode transistor coupled between the charging node and the first power supply voltage, the first saturation-mode transistor comprising a first drain and a first gate, wherein the first gate is coupled to the first drain; and
   a second capacitor connected between the charging node and the ground.

3. The reference circuit of claim 2, wherein the resistive element of the RC circuit comprises one or more transistors having gates coupled to the charging node.

4. The reference circuit of claim 2,
   wherein the reverse-biased diode-connected transistor is an n-channel Metal Oxide Semiconductor Field Effect Transistor (MOSFET); and
   wherein the first saturation-mode transistor is a p-channel MOSFET.

5. The reference circuit of claim 2, wherein the bias string further comprises:
   a second saturation-mode transistor coupled between the first saturation-mode transistor and the first power supply voltage, the second saturation-mode transistor comprising a second drain and a second gate, wherein the second gate is coupled to the second drain and to a source of the first saturation-mode transistor,
   wherein the second saturation-mode transistor is fabricated in a same well as the first saturation-mode transistor.

6. The reference circuit of claim 1, wherein a voltage of the first power supply voltage is greater than a voltage of the second power supply voltage.

7. The reference circuit of claim 1, further comprising:
   a second power-down start-up circuit powered by a third power supply voltage of the plurality of power supply voltages and comprising a second pulse generation circuit that generates a second start-up signal; and
   wherein the reference generating circuit is further configured to transition from the low-power mode to the normal mode when the second start-up signal is generated.

8. The reference circuit of claim 1, wherein the supply start-up circuit further comprises:
   a voltage limiter circuit comprising a plurality of forward-biased diode-connected transistors connected in series between the pulse node and the ground.

9. An electronic device powered by a first power supply voltage, the electronic device comprising:
   a supply power generation circuit producing a second power supply voltage using the first power supply voltage, and
   a reference circuit comprising:
      a supply start-up circuit comprising a resistive-capacitive (RC) circuit coupled between the first power supply voltage and a ground and including a first capacitor, a resistive element, and a pulse node coupled between the first capacitor and the resistive element, wherein a power-up pulse signal is generated at the pulse node;
      a first power-down start-up circuit powered by the second power supply voltage and comprising a first pulse generation circuit that generates a first start-up signal; and
      a reference generating circuit outputting a reference signal, the reference generating circuit configured to enter a normal mode when the power-up pulse signal is generated and to transition from a low-power mode to the normal mode when the first start-up signal is generated.

10. The electronic device of claim 9, wherein the reference circuit further comprises:

a bias string comprising a plurality of transistors connected in series between the first power supply voltage and the ground, the plurality of transistors including:
a reverse-biased diode-connected transistor coupled between a charging node and the ground, and
a first saturation-mode transistor coupled between the charging node and the first power supply voltage, the first saturation-mode transistor comprising a first drain and a first gate, wherein the first gate is coupled to the first drain; and
a second capacitor connected between the charging node and the ground.

11. The electronic device of claim 10, wherein the resistive element of the RC circuit comprises one or more transistors having gates coupled to the charging node.

12. The electronic device of claim 10,
wherein the reverse-biased diode-connected transistor is an n-channel Metal Oxide Semiconductor Field Effect Transistor (MOSFET); and
wherein the first saturation-mode transistor is a p-channel MOSFET.

13. The electronic device of claim 10, wherein the bias string further comprises:
a second saturation-mode transistor coupled between the first saturation-mode transistor and the first power supply voltage, the second saturation-mode transistor comprising a second drain and a second gate, wherein the second gate is coupled to the second drain and to a source of the first saturation-mode transistor,
wherein the second saturation-mode transistor is fabricated in a same well as the first saturation-mode transistor.

14. The electronic device of claim 9, further comprising:
a second power-down start-up circuit powered by a third power supply voltage and comprising a second pulse generation circuit that generates a second start-up signal,
wherein the supply power generation circuit produces the third power supply voltage using the first power supply voltage, and
wherein the reference generating circuit is further configured to transition from a low-power mode to the normal mode when the second start-up signal is generated.

15. The electronic device of claim 9, wherein the supply start-up circuit further comprises:
a voltage limiter circuit comprising a plurality of forward-biased diode-connected transistors connected in series between the pulse node and the ground.

16. A method of controlling a mode of a reference generating circuit in an electronic device having a plurality of power supply voltages, the method comprising:
producing, at a pulse node of a resistive-capacitive (RC) circuit powered by a first power supply voltage of the plurality of power supply voltages, a power-up pulse signal when the first power supply voltage is turned on;
placing the reference generating circuit in a low-power mode when a first power-down enable signal associated with a second power supply voltage of the plurality of power supply voltages is asserted;
producing, using a first pulse generation circuit, a first start signal when the first power-down enable signal is de-asserted;
placing the reference generating circuit in a normal mode when the power-up pulse signal is produced; and
transitioning the reference generating circuit from the low power mode to the normal mode when the first start signal is produced.

17. The method of claim 16, further comprising:
placing the reference generating circuit in the low-power mode when the first power-down enable signal and a second power-down enable signal associated with a third power supply voltage of the plurality of power supply voltages are both asserted; and
producing, using a second pulse generation circuit, a second start signal when the second power-down enable signal is de-asserted; and
transitioning the reference generating circuit from the low power mode to the normal mode when the second start signal is produced.

18. The method of claim 17, further comprising:
producing a bias voltage using a bias string, the bias string comprising:
a reverse-biased diode-connected transistor coupled between a charging node and a ground,
a first saturation-mode transistor coupled between the charging node and the first power supply voltage, the first saturation-mode transistor comprising a first drain and a first gate, wherein the first gate is coupled to the first drain, and
a capacitor connected between the charging node and the ground.

19. The method of claim 18, further comprising:
controlling a resistance of a resistive element of the RC circuit according to a voltage at the charging node,
wherein the RC circuit comprises a capacitor coupled between the pulse node and the first power supply voltage and the resistive element coupled between the pulse node and the ground.

20. The method of claim 16, further comprising limiting, using a voltage limiter circuit comprising one or more diode-connected transistors couple in series, a maximum voltage of the power-up pulse signal.

* * * * *